(12) United States Patent
Yao et al.

(10) Patent No.: US 11,523,350 B2
(45) Date of Patent: Dec. 6, 2022

(54) POWER CONTROL METHOD AND APPARATUS, BASE STATION, TERMINAL, AND COMPUTER-READABLE STORAGE MEDIUM

(71) Applicant: ZTE CORPORATION, Guangdong (CN)

(72) Inventors: Ke Yao, Shenzhen (CN); Feiming Wang, Shenzhen (CN); Bo Gao, Shenzhen (CN); Zhaohua Lu, Shenzhen (CN); Wei Gou, Shenzhen (CN)

(73) Assignee: ZTE Corpoation, Guangdong (CN)

( * ) Notice: Subject to any disclaimer, the term of this patent is extended or adjusted under 35 U.S.C. 154(b) by 0 days.

(21) Appl. No.: 17/071,360

(22) Filed: Oct. 15, 2020

(65) Prior Publication Data

US 2021/0105726 A1 Apr. 8, 2021

Related U.S. Application Data

(63) Continuation of application No. PCT/CN2019/082938, filed on Apr. 16, 2019.

(30) Foreign Application Priority Data

Apr. 17, 2018 (CN) .......................... 201810345623.0

(51) Int. Cl.
*H04W 52/04* (2009.01)
*H04W 52/24* (2009.01)
(Continued)

(52) U.S. Cl.
CPC ......... *H04W 52/242* (2013.01); *H04W 52/08* (2013.01); *H04W 52/10* (2013.01);
(Continued)

(58) Field of Classification Search
CPC ..... H04W 72/14; H04W 52/04; H04W 52/18; H04W 52/10; H04W 52/58; H04W 52/06;
(Continued)

(56) References Cited

U.S. PATENT DOCUMENTS

2011/0250918 A1* 10/2011 Jen ...................... H04W 52/365
455/517
2017/0366328 A1* 12/2017 Seo ........................ H04L 5/0051
2019/0081737 A1* 3/2019 Huang ................. H04B 7/0621

FOREIGN PATENT DOCUMENTS

EP 2 763 470 A1 8/2014

OTHER PUBLICATIONS

CATT: "Remaining Issues of Non-CA Based Power Control" 3GPP TSG RAN WG1 Meeting #92bis RI-1803763, Apr. 7, 2018 (Apr. 7, 2018), Sanya, China (16 pages).
(Continued)

*Primary Examiner* — Tu X Nguyen
(74) *Attorney, Agent, or Firm* — Foley & Lardner LLP

(57) ABSTRACT

Provided are a power control method, a power control apparatus, a base station, a terminal and a computer-readable storage medium. The method includes: a second communication node configuring a power control parameter for a first communication node, where the power control parameter includes at least one transmit power offset, and the transmit power offset is determined by at least one of: a payload size of physical uplink control channel (PUCCH) transmission, a number of orthogonal frequency division multiplexing (OFDM) symbols occupied by PUCCH transmission, a number of resource blocks (RBs) occupied by PUCCH transmission, or whether a PUCCH is subjected to frequency hopping.

20 Claims, 3 Drawing Sheets

A second communication node configures a power control parameter for a first communication node, where the power control parameter includes at least one transmit power offset, and the transmit power offset is determined by at least one of: a payload size of a PUCCH transmission, the number of OFDM symbols occupied by the PUCCH transmission, the number of RBs occupied by the PUCCH transmission, or whether a PUCCH is subjected to frequency hopping — 101

(51) Int. Cl.
  *H04W 52/08* (2009.01)
  *H04W 52/10* (2009.01)
  *H04W 52/14* (2009.01)
  *H04W 52/36* (2009.01)
  *H04W 72/04* (2009.01)
  *H04W 72/12* (2009.01)

(52) U.S. Cl.
  CPC ......... *H04W 52/146* (2013.01); *H04W 52/36* (2013.01); *H04W 72/0413* (2013.01); *H04W 72/1289* (2013.01); *H04W 72/0473* (2013.01)

(58) Field of Classification Search
  CPC ..... H04W 52/36; H04W 52/32; H04W 88/02; H04W 72/04
  See application file for complete search history.

(56) References Cited

OTHER PUBLICATIONS

Intel Corporation: "On Power Control Framework" 3GPP TSG RAN WG1 Meeting #92bis RI-1804736, Apr. 7, 2018 (Apr. 7, 2018),Sanya, China (5 pages).

International Search Report for PCT Appl. No. PCT/CN2019/082938 dated Jul. 18, 2019.

VIVO: "Remaining Issues on NR UL Power Control" 3GPP TSG RAN WG1 Meeting #92 RI-1801546, Mar. 2, 2018 (Mar. 2, 2018), Athens, Greece (5 pages).

3rd Generation Partnership Project: "Technical Specification Group Radio Access Network; NR; Physical layer procedures for control (Release 15)" 3GPP TS 38.213 V15.0.0; Mobile Competence Centre; 650, Route Des Lucioles; F-06921 Sophia-Antipolis Cedex; France; Jan. 3, 2018 (56 pages).

Extended European Search Report for EP Appl. No. 19789515.4, dated May 3, 2021 (9 pages).

ZTE et al.: "Summary for AI 7.1.6.1 NR UL power control in non-CA aspects" 3GPP TSG RAN WG1 Meeting #92; R1-1803282; Mar. 2, 2018; Athens, Greece (28 pages).

3rd Generation Partnership Project, "Technical Specification Group Radio Access Network; NR; Physical layer procedures for control (Release 15)", 3GPP Standard; Technical Specification; 3GPP TS 38.213, 3rd Generation Partnership Project (3GPP) vol. RAN WG1, No. V15.0.0, Jan. 3, 2018 (56 Pages).

First Examination Report for IN Appl. No. 202027043217, dated Aug. 19, 2022 (6 pages).

ZTE, "Summary for AI 7.1.6.1 NR UL power control in non-CA aspects" 3GPP TSG RAN WG1 Meeting #93, R1-1807653, May 25, 2018, Busan, Korea (27 pages).

\* cited by examiner

FIG. 1

101 — A second communication node configures a power control parameter for a first communication node, where the power control parameter includes at least one transmit power offset, and the transmit power offset is determined by at least one of: a payload size of a PUCCH transmission, the number of OFDM symbols occupied by the PUCCH transmission, the number of RBs occupied by the PUCCH transmission, or whether a PUCCH is subjected to frequency hopping

FIG. 2

201 — First configuration unit

FIG. 3

301 — A second communication node configures at least one spatial relationship for a BWP of a first communication node, and configures at least one set of power control parameters for each spatial relationship, where each set of power control parameters corresponds to a power influence factor set, and the power influence factor set includes at least one of the following power influence factors: a payload size of a PUCCH transmission, the number of OFDM symbols occupied by the PUCCH transmission, the number of RBs occupied by the PUCCH transmission, or whether a PUCCH is subjected to frequency hopping

FIG. 4

401 — Second configuration unit

501 — A first communication node receives a power control parameter from a second communication node, where the power control parameter includes at least one transmit power offset, and the transmit power offset is determined by at least one of: a payload size of a PUCCH transmission, the number of OFDM symbols occupied by the PUCCH transmission, the number of RBs occupied by the PUCCH transmission, or whether a PUCCH is subjected to frequency hopping 502 — The first communication node determines a transmit power of the PUCCH according to an actual PUCCH transmission parameter

FIG. 5

601 — A first communication node receives a spatial relationship configured by a second communication node for a BWP of the first communication node, and receives at least one set of power control parameters configured by the second receiving node for each spatial relationship, where each set of power control parameters corresponds to a power influence factor set, and the power influence factor set includes at least one of the following power influence factors: a payload size of a PUCCH transmission, the number of OFDM symbols occupied by the PUCCH transmission, the number of RBs occupied by the PUCCH transmission, or whether a PUCCH is subjected to frequency hopping 602 — The first communication node determines a transmit power of the PUCCH according to an actual PUCCH transmission parameter

FIG. 6

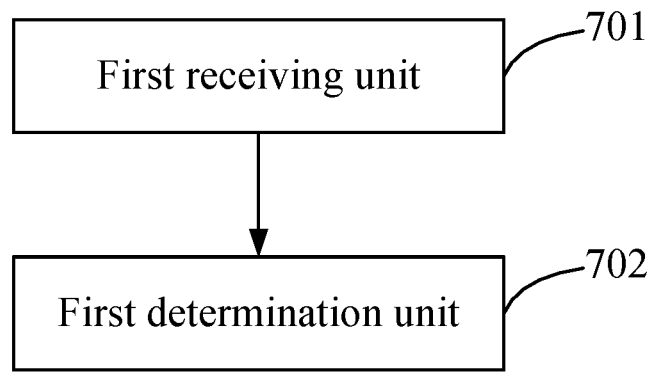

FIG. 7

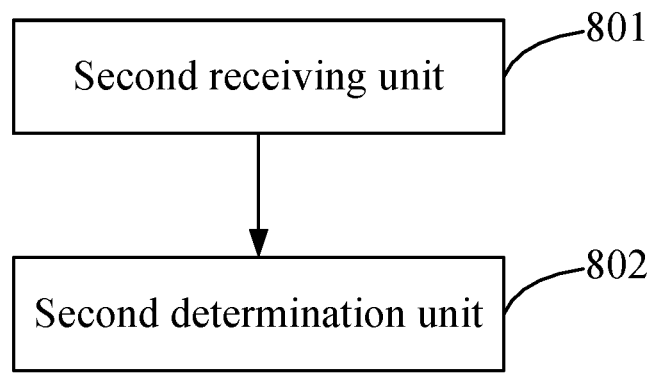

FIG. 8

| Determine a power control parameter of a PUSCH according to a power control parameter of a PUCCH, where a determination approach includes at least one of: determining an open-loop power control parameter of the PUSCH according to an open-loop power control parameter of the PUCCH; determining an RS parameter of PL of the PUSCH according to an RS parameter of PL of the PUCCH; or determining a closed-loop power control parameter of the PUSCH according to a closed-loop power control parameter of the PUCCH | —901 |

FIG. 9

POWER CONTROL METHOD AND APPARATUS, BASE STATION, TERMINAL, AND COMPUTER-READABLE STORAGE MEDIUM

CROSS-REFERENCE TO RELATED APPLICATIONS

This application claims the benefit of priority under 35 U.S.C. § 120 as a continuation of PCT Patent Application No. PCT/CN2019/082938, filed on Apr. 16, 2019, which claims priority to Chinese patent application no. 201810345623.0, filed on Apr. 17, 2018, the disclosure of each of which is incorporated herein by reference in its entirety.

TECHNICAL FIELD

The present disclosure relates to the technical field of radio communication, and in particular relates to a power control method, a power control apparatus, a base station, a terminal, and a computer-readable storage medium.

BACKGROUND

5G New Radio (NR) is an ongoing research project of the 3rd Generation Partnership Project (3GPP). The 5G NR has determined an orthogonal frequency division multiplexing (OFDM)-based new radio air interface standard. The standard will become the foundation of the next generation of mobile networks. As the fifth generation mobile communication system, the NR technology needs to support an unprecedented number of different types of application scenarios, as well as traditional frequency bands, high frequency bands and beam modes, bringing great challenges to the design of power control.

The power of uplink transmission is related to many factors such as pathloss, target received power, maximum transmit power, closed-loop power adjustment amount, transmission bandwidth and transmission rate. In NR, uplink transmission includes transmission of physical uplink shared channel (PUSCH), physical uplink control channel (PUCCH), sounding reference signal (SRS) and other channels. In long term evolution (LTE), the power control of the PUCCH includes an open-loop power control part, a closed-loop power control part, a pathloss compensation part, a PUCCH format-related power offset, a transmission rate-related power offset, etc. The payload size of PUCCH transmission and the time-frequency resources occupied by PUCCH transmission both affect the power of the PUCCH, however, the effects of these factors cannot be accurately reflected in the power control of the PUCCH in the related art.

SUMMARY

The present disclosure provides a power control method. The method includes: a second communication node configuring a power control parameter for a first communication node, where the power control parameter includes at least one transmit power offset, and the transmit power offset is determined by at least one of: a payload size of a PUCCH transmission, a number of OFDM symbols occupied by the PUCCH transmission, a number of resource blocks (RBs) occupied by the PUCCH transmission, or whether a PUCCH is subjected to frequency hopping.

The present disclosure provides a power control apparatus including a first configuration unit. The first configuration unit is configured to configure a power control parameter for a first communication node, where the power control parameter includes at least one transmit power offset, and the transmit power offset is determined by at least one of: a payload size of a PUCCH transmission, a number of OFDM symbols occupied by the PUCCH transmission, a number of RBs occupied by the PUCCH transmission, or whether a PUCCH is subjected to frequency hopping.

The present disclosure provides a power control method. The method includes: a second communication node configuring at least one spatial relationship for a bandwidth part (BWP) of a first communication node, and configuring at least one set of power control parameters for each spatial relationship, where each set of power control parameters corresponds to one power influence factor set, and the power influence factor set includes at least one of the following power influence factors: a payload size of a PUCCH transmission, a number of OFDM symbols occupied by the PUCCH transmission, a number of RBs occupied by the PUCCH transmission, or whether a PUCCH is subjected to frequency hopping.

The present disclosure provides a power control apparatus including a second configuration unit. The second configuration unit is configured to configure at least one spatial relationship for a BWP of a first communication node, and configure at least one set of power control parameters for each spatial relationship, where each set of power control parameters corresponds to one power influence factor set, and the power influence factor set includes at least one of the following power influence factors: a payload size of a PUCCH transmission, a number of OFDM symbols occupied by the PUCCH transmission, a number of RBs occupied by the PUCCH transmission, or whether a PUCCH is subjected to frequency hopping.

The present disclosure provides a base station including a processor and a memory, where the processor is configured to execute a power control program stored in the memory to implement steps in any power control method described above.

The present disclosure provides a computer-readable storage medium. The computer-readable storage medium is configured to store one or more programs executable by one or more processors to implement steps in any power control method described above.

The present disclosure provides a power control method. The method includes: a first communication node receiving a power control parameter from a second communication node, where the power control parameter includes at least one transmit power offset, and the transmit power offset is determined by at least one of: a payload size of a PUCCH transmission, a number of OFDM symbols occupied by the PUCCH transmission, a number of RBs occupied by the PUCCH transmission, or whether a PUCCH is subjected to frequency hopping; and the first communication node determining a transmit power of the PUCCH according to an actual PUCCH transmission parameter.

The present disclosure provides a power control apparatus including a first receiving unit and a first determination unit. The first receiving unit is configured to receive a power control parameter from a second communication node, where the power control parameter includes at least one transmit power offset, and the transmit power offset is determined by at least one of: a payload size of a PUCCH transmission, a number of OFDM symbols occupied by the PUCCH transmission, a number of RBs occupied by the PUCCH transmission, or whether a PUCCH is subjected to frequency hopping. The first determination unit is configured to determine a transmit power of the PUCCH according to an actual PUCCH transmission parameter.

The present disclosure provides a power control method. The method includes: a first communication node receiving a spatial relationship configured by a second communication node for a BWP of the first communication node, and receiving at least one set of power control parameters configured by the second receiving node for each spatial relationship, where each set of power control parameters corresponds to one power influence factor set, and the power influence factor set includes at least one of the following power influence factors: a payload size of a PUCCH transmission, a number of OFDM symbols occupied by the PUCCH transmission, a number of RBs occupied by the PUCCH transmission, or whether a PUCCH is subjected to frequency hopping; and the first communication node determining a transmit power of the PUCCH according to an actual PUCCH transmission parameter.

The present disclosure provides a power control apparatus including a second receiving unit and a second determination unit. The second receiving unit is configured to receive a spatial relationship configured by a second communication node for a BWP of an apparatus to which the second receiving unit belongs, and receive at least one set of power control parameters for each spatial relationship from the second communication node, where each set of power control parameters corresponds to one power influence factor set, and the power influence factor set includes at least one of the following power influence factors: a payload size of a PUCCH transmission, a number of OFDM symbols occupied by the PUCCH transmission, a number of RBs occupied by the PUCCH transmission, or whether a PUCCH is subjected to frequency hopping. The second determination unit is configured to determine a transmit power of the PUCCH according to an actual PUCCH transmission parameter.

The present disclosure provides a power control method. The method includes: determining a power control parameter of a PUSCH according to a power control parameter of a PUCCH, where a determination approach includes at least one of: determining an open-loop power control parameter of the PUSCH by an open-loop power control parameter of the PUCCH; determining a reference signal (RS) parameter of pathloss (PL) of the PUSCH by an RS parameter of PL of the PUCCH; or determining a closed-loop power control parameter of the PUSCH by a closed-loop power control parameter of the PUCCH.

The present disclosure provides a power control apparatus including a fourth determination unit.

The fourth determination unit is configured to determine a power control parameter of a PUSCH according to a power control parameter of a PUCCH, where a determination approach includes at least one of: determining an open-loop power control parameter of the PUSCH by an open-loop power control parameter of the PUCCH; determining an RS parameter of PL of the PUSCH by an RS parameter of PL of the PUCCH; or determining a closed-loop power control parameter of the PUSCH by a closed-loop power control parameter of the PUCCH.

The present disclosure provides a terminal including a processor and a memory, where the processor is configured to execute a power control program stored in the memory to implement steps in any power control method described above.

The present disclosure provides a computer-readable storage medium. The computer-readable storage medium is configured to store one or more programs executable by one or more processors to implement steps in any power control method described above.

Compared with the existing art, in the present invention, the transmit power offset, which is determined by at least one of the payload size of PUCCH transmission, the number of OFDM symbols occupied by PUCCH transmission, the number of RBs occupied by PUCCH transmission, or whether the PUCCH is subjected to frequency hopping, is configured by the second communication node for the first communication node, so that the second communication node and the first communication node can more accurately control uplink transmit power of the PUCCH.

Other features and advantages of the present disclosure will be elaborated hereinafter in the description and, moreover, partially become apparent from the description, or will be understood through implementation of the present disclosure. The object and other advantages of the present disclosure may be implemented and obtained through structures set forth in the description, claims and drawings.

BRIEF DESCRIPTION OF DRAWINGS

The drawings are used to provide a further understanding of the technical solutions of the present disclosure, constitute a part of the description, explain the technical solutions of the present disclosure in conjunction with the embodiments of the present application, and do not limit the technical solutions of the present disclosure. In the drawings:

FIG. 1 is a schematic flowchart of a power control method according to a first embodiment of the present disclosure;

FIG. 2 is a schematic structural diagram of a power control apparatus according to the first embodiment of the present disclosure;

FIG. 3 is a schematic flowchart of a power control method according to a second embodiment of the present disclosure;

FIG. 4 is a schematic structural diagram of a power control apparatus according to the second embodiment of the present disclosure;

FIG. 5 is a schematic flowchart of a power control method according to a third embodiment of the present disclosure;

FIG. 6 is a schematic flowchart of a power control method according to a fourth embodiment of the present disclosure;

FIG. 7 is a schematic structural diagram of a power control apparatus according to the third embodiment of the present disclosure;

FIG. 8 is a schematic structural diagram of a power control apparatus according to the fourth embodiment of the present disclosure; and FIG. 9 is a schematic flowchart of a power control method according to a fifth embodiment of the present disclosure.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

Steps illustrated in the flowcharts of the drawings may be performed by a computer system such as a group of computers capable of executing instructions. Further, although logical sequences are shown in the flowcharts, in some cases, the shown or described steps may be performed in sequences different from those illustrated herein.

In a radio communication system, transmit power control is required for transmission to reduce power consumption of a sending device and alleviate interference to other transmission due to unnecessary high-power sending. The transmit power is affected by factors such as the size of a communication range, maximum transmit powers and receiving sensitivities of transceiving devices of both parties in a communication, a modulation and coding scheme of data and data rate, an operating frequency band, and a bandwidth occupied by transmission. Generally, lower transmit power needs to be used as much as possible under the condition that a quality requirement of a received signal at a receiving end is satisfied.

In the general communication technology, communication node 1 sends a reference signal, and communication node 2 measures a pathloss (PL) from node 1 to node 2 according to the reference signal. The PL is equal to a transmit power of the reference signal at node 1 minus a received power of the reference signal received at node 2. Assuming that the PL of a transmission channel from node 2 to node 1 is the same as the PL of a transmission channel from node 1 to node 2, node 2 may use the PL described above to calculate the transmit power of transmission from node 2 as a sending node to node 1. Since PL is single-sided measured, this factor belongs to an open-loop part of the transmit power. Node 1 receives the transmission and then performs analysis, and provides node 2 with power adjustment information according to reception quality. This process belongs to closed-loop power control.

In LTE, a link from a base station to a terminal is a downlink, and a link from the terminal to the base station is an uplink. The power of the downlink is determined by the base station according to a channel measurement result of each scheduled UE and a scheduling algorithm. The power control of the uplink is in a manner of open loop combined with closed loop. In addition, specific factors related to transmission, such as a sending rate, a modulation and coding scheme (MCS) level, a sending bandwidth also affect power.

The following is a transmit power calculation formula of a PUSCH channel of LTE. Taking this formula as an example, various parameters affecting power are explained.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$ (Formula 1)

The subscript c in the above formula refers to a cell, and each component carrier (CC) supporting the carrier aggregation (CA) function corresponds to one cell. As can be seen from the above formula, each parameter in the power calculation formula is configured/calculated by distinguishing between cells. All descriptions herein are directed to one CC when the frequency domain range is not specifically illustrated. It should be noted that all of the parameters herein can be extended to multiple CCs, and it is simply required that configured and calculated parameters which are related to power are independently configured for each CC.

The open-loop part of the power $P_{PUSCH}$ of uplink transmission of the PUSCH depends on a target received power $P_{O\_PUSCH}$, a pathloss (PL) amount and a pathloss factor $\alpha$. The target received power is classified into a cell-level parameter and a UE-level parameter which are determined by the base station and configured for the UE. For the closed-loop part, a closed-loop power control adjustment amount is determined by the base station according to a difference between a measurement result and a target and is notified to the UE in a manner of transmit power control command (TPC command, i.e., $\delta_{PUSCH}$ in DCI for the PUSCH). The UE maintains a local power adjustment amount f(i), performs update according to the transmit power control command, and achieves the purpose of closed-loop control of power by adopting the above formula. Here, i is a subframe number, $\Delta TF$ is an MCS-related power offset and $P_{CMAX}$ is a maximum power limit for the UE.

The cell-level target received power P0_nominal in LTE is to distinguish between the PUSCH (semi-static, dynamic, MSG3) and the PUCCH, which correspond to different block error ratio (BLER) requirements respectively. The UE-level target received power parameter P0_UE_specific is also configured by distinguishing between the above items to compensate for systematic deviations such as a PL estimation error and an absolute output power setting error. According to the transmit power control command, f(i) is updated in two manners: an accumulative manner and an absolute value manner. In the absolute value manner, a UE-local closed-loop power adjustment amount f(i) is updated by directly using a transmit power control command sent by a base station. In the accumulative manner, a UE-local closed-loop power adjustment amount f(i) is jointly determined by the transmit power control command sent by the base station and a historical value of the UE-local closed-loop power adjustment amount. It should be noted that f(i) here denotes a local closed-loop power adjustment amount of the UE. For PUCCH transmission, ignoring the meaning of the subscript, a UE-local closed-loop power control adjustment amount is denoted, in the power control formula, by g(i), which is similar to f(i) for the PUSCH in meaning and is a local closed-loop power adjustment amount of the UE for the PUCCH.

The UE-local closed-loop power adjustment amount f(i) is also referred to as a power control adjustment state.

The 5G technology introduces a beam transmission manner, and both the base station and the UE support a multiple-beam manner. During operation in a beam mode, a feature of a beam needs to be taken into account for the power calculation. To support the beam manner, the power control parameters are configured in 3 parts: open-loop power control parameters, closed-loop power control parameters, and RS parameters of pathloss. For each part, multiple configuration is supported. That is, at most J open-loop power control parameters (or sets thereof) can be configured, and a serial number of each open-loop power control parameter (or set thereof) is j; at most K RS parameters of pathloss (or sets thereof) can be configured, and a serial number of each RS parameter of pathloss (or set thereof) is k; and at most L closed-loop power control parameters (or sets thereof) can be configured, and a serial number of each closed-loop power control parameter (or set thereof) is l. Here, j is an integer greater than 0 and less than or equal to J, k is an integer greater than 0 and less than or equal to K, l is an integer greater than 0 and less than or equal to L, and J, K and L are all integers greater than 0.

If the UE supports multiple beams (or beam groups), the base station configures an association between each possible beam (or beam group) and open-loop power control parameters, closed-loop power control parameters, and RS parameters of pathloss. The beam (or beam group) may be indicated through a reference signal resource.

The reference signal includes at least one of: an uplink sounding reference signal (SRS), a channel state information reference signal (CSI-RS), a secondary synchronization block (SSB), a phase tracking reference signal (PTRS), a tracking reference signal (TRS), or a demodulation reference signal (DMRS).

The base station indicates a reference signal resource for the uplink transmission of the UE, so that the UE obtains the power control parameter associated with the reference signal resource.

In an example, the base station configures J1 open-loop power control parameters (or sets thereof), K1 RS parameters of pathloss (or sets thereof), and L1 closed-loop power control parameters (or sets thereof) for the PUSCH transmission of the UE. The base station configures the UE with a PUSCH transmission manner such as codebook based transmission or non-codebook based transmission. The base station configures the UE with an uplink SRS resource set based on the PUSCH transmission manner, the uplink SRS resource set including at least one uplink SRS resource. The base station sends downlink control information (DCI) to the UE, where the DCI includes an SRS resource indicator (SRI), and the SRI can be used for determining precoding of PUSCH transmission. SRI sets indicated in DCI in different PUSCH transmission manners may be different. For example, an SRI set for codebook based transmission may have 2 SRIs, each SRI representing one SRS resource; an SRI set for non-codebook based transmission may have 15 SRIs, each SRI representing one SRS resource or multiple SRS resources. The base station configures the UE with an association between each SRI in the SRI set indicated in the DCI and at least one of: a serial number of an open-loop power control parameter (or set thereof), a serial number of an RS parameter (or set thereof) of pathloss, or a serial number of a closed-loop power control parameter (or set thereof). The base station notifies, through the SRI in the DCI, the UE of the power control parameter for PUSCH transmission.

In another example, the base station configures J2 open-loop power control parameters (or sets thereof), K2 RS parameters of pathloss (or sets thereof), and L2 closed-loop power control parameters (or sets thereof) for the PUCCH transmission of the UE. The base station configures at least one spatial relationship of the PUCCH for the UE, and configures an association between the spatial relationship and the power control parameter for PUCCH transmission. The base station notifies the UE of the spatial relationship of the PUCCH in at least one of the following manners: one spatial relationship is configured for the PUCCH through high-layer signaling; at least one spatial relationship is configured for the PUCCH through high-layer signaling, and one of the at least one spatial relationship is indicated through MAC CE and/or physical layer signaling; or the UE determines the spatial relationship of the PUCCH by the UE itself. For example, when the UE is in a non-RRC connected state, the UE determines the spatial relationship of the PUCCH by the UE itself.

The UE can determine the spatial relationship of the PUCCH according to a downlink channel measurement result.

The UE obtains the power control parameter for the PUCCH transmission according to the spatial relationship of the PUCCH and the association between the spatial relationship and the power control parameter for the PUCCH transmission.

The spatial relationship is indicated by reference signal information.

The SRS resource, the SRS resource set, and the power control parameter are configured based on at least one of the following frequency domain units: BWP or CC.

For the PUCCH, the power calculation formula is as follows:

$$P_{PUCCH,f,c}(i, q_u, q_d, l) = \min \begin{Bmatrix} P_{CMAX,f,c}(i), \\ P_{O\_PUCCH,f,c}(q_u) + PL_{f,c}(q_d) + \Delta_{F\_PUCCH}(F) + \\ \Delta_{TF,f,c}(i) + g_{f,c}(i,l) + 10\log_{10}(2^\mu \cdot M_{RB,f,c}^{PUCCH}(i)) \end{Bmatrix}$$

F refers to different PUCCH formats, such as PUCCH format 0, PUCCH format 1, PUCCH format 4. For PUCCH format 2/PUCCH format 3/PUCCH format 4, different payload sizes can be supported.

For large payload, for example, payload whose size is greater than 11 bits, $\Delta_{TF,f,c}(i)=10\log_{10}(2^{K1\cdot BPRE(i)}-1)$. For small payload, for example, payload whose size is less than or equal to 11 bits, $\Delta_{TF,f,c}(i)=10\log_{10}(K2\cdot BPREs(i))$. TF denotes the Transport Format, f denotes the serial number of a carrier, c denotes the cell, and i denotes the serial number of an uplink subframe, or the serial number of a time slot, or the serial number of PUCCH transmission; BPRE is Bit Per Resource Element, i.e., bit rate, and may include the ratio of the number of payload bits of the PUCCH to the number of REs. The payload of the PUCCH includes ACK/NAK (acknowledgement/negative acknowledgement of HARQ), a scheduling request (SR), channel state information (CSI), and the number of possible CRC bits. BPREs is BPRE for small payload. The BPRE for small payload may not be provided with CRC. K1 and K2 are coefficients of BPRE.

In relevant standard, each PUCCH format is configured with one power offset value $\Delta_{F\_PUCCH}(F)$. In order to simplify the standard, K1 and K2 are valued regardless of various cases, so the influence of other factors (e.g., the number of OFDM symbols, the number of RBs, whether frequency hopping is performed, etc.) on power cannot be reflected in the power control framework in the related art. The simulation result shows that these factors cannot be ignored, otherwise the difference between the fitting result and the simulation result is too large.

The base station configures at least one component carrier (CC) for the UE, and each CC includes at least one bandwidth part (BWP).

The base station configuring a PUCCH parameter for the UE may include configuring a PUCCH resource set on the BWP, where each PUCCH resource set includes at least one PUCCH resource.

A PUCCH format, a starting position of RBs, a number of RBs, a starting position of OFDM symbols, a number of OFDM symbols, and whether frequency hopping is performed are configured for the PUCCH resource.

A maximum payload size is configured for the PUCCH resource set.

As shown in FIG. 1, a power control method is provided in an embodiment of the present disclosure and includes a step described below.

In step 101, a second communication node configures a power control parameter for a first communication node, where the power control parameter includes at least one transmit power offset, and the transmit power offset is determined by at least one of: a payload size of a PUCCH transmission, a number of OFDM symbols occupied by the PUCCH transmission, a number of RBs occupied by the PUCCH transmission, or whether a PUCCH is subjected to frequency hopping.

It should be noted that the second communication node described in the present disclosure may be replaced by the names of various communication nodes such as NodeB (NB), gNB, transmitter receiver point (TRP) and access point (AP).

The first communication node described in the present disclosure may be replaced by the names of various communication nodes such as station, user, STA, Relay, terminal and user terminal.

In the embodiment, at least one transmit power offset is configured for any of the following PUCCH formats: PUCCH format 2, PUCCH format 3, and PUCCH format 4. The at least one transmit power offset is used for a payload size interval of the PUCCH, a number of transmit power offset being the same as a number of the payload size interval. For example, two transmit power offsets are configured and correspond to a large payload interval of the PUCCH and a small payload interval of the PUCCH.

In an embodiment, the payload interval is predefined. For example, the large payload interval refers to an interval of more than 11 bits, and the small payload interval refers to an interval of 3 bits to 11 bits.

It is to be noted that the transmit power offset described in the present disclosure is determined by at least one of: the payload size of the PUCCH transmission, the number of OFDM symbols occupied by the PUCCH transmission, the number of RBs occupied by the PUCCH transmission, or whether the PUCCH is subjected to frequency hopping. Such determination refers to that when the second communication node sends the power control parameter, the second communication node carries a correspondence between different payload sizes of PUCCH transmission and transmit power offsets, a correspondence between different numbers of OFDM symbols occupied by PUCCH transmission and the transmit power offsets, a correspondence between different numbers of RBs occupied by PUCCH transmission and the transmit power offsets, and a correspondence between whether the PUCCH is subjected to frequency hopping and the transmit power offsets. Alternatively, the second communication node calculates the transmit power offset in advance according to the payload size of PUCCH transmission, the number of OFDM symbols occupied by PUCCH transmission, the number of RBs occupied by PUCCH transmission, or whether the PUCCH is subjected to frequency hopping, and sends the calculated transmit power offset to the first communication node.

In the embodiment, the transmit power offset may be configured for at least one of: a PUCCH resource of the first communication node, a PUCCH resource set of the first communication node, or a BWP of the first communication node.

In an embodiment, when the transmit power offset is configured for the PUCCH resource set or the BWP, the PUCCH format is distinguished for configuring the transmit power offset. Specifically, for one PUCCH format of the first communication node, at least one transmit power offset needs to be configured.

It should be noted that a correspondence exists between PUCCH resources and PUCCH formats. Therefore, when a transmit power offset is configured for the PUCCH resource, the configuration is only performed for the PUCCH format corresponding to the PUCCH resource.

For one PUCCH resource of the first communication node, the power control parameter includes at least one transmit power offset. For example, at least one transmit power offset is configured for each PUCCH resource of part or all of the PUCCH resources, and the at least one transmit power offset corresponds to different payload size intervals for PUCCH transmission.

In the embodiment, the transmit power is obtained by at least one of: a reference amount of the transmit power offset, or a sum of the reference amount of the transmit power offset and a correction amount of the transmit power offset.

In an embodiment, the correction amount of the transmit power offset is predefined.

In an embodiment, one reference amount of the transmit power offset is configured for the BWP of the first communication node, and at least one correction amount of the transmit power offset is configured for the BWP of the first communication node.

In an embodiment of the present disclosure, one transmit power offset is determined by using one reference amount of the transmit power offset, and other transmit power offset is determined by the sum of the reference amount of the transmit power offset and each correction amount of the transmit power offset. Thus, a total number of transmit power offsets that can be determined is equal to one plus the number of correction amount of the transmit power offset.

In another embodiment of the present disclosure, the transmit power offset is determined by the sum of one reference amount of the transmit power offset and each correction amount of the transmit power offset, and thus a total number of transmit power offsets that can be determined is equal to the number of correction amount of the transmit power offset.

In the embodiment, the transmit power offset is used for all PUCCH resources of the BWP.

At least one transmit power offset is used for a payload size interval of the PUCCH, the number of transmit power offset being the same as the number of the payload size interval. For example, two transmit power offsets are respectively used for a large payload interval of the PUCCH and a small payload interval of the PUCCH.

In an embodiment, one reference amount of the transmit power offset is configured for the BWP of the first communication node, and at least one correction amount of the transmit power offset is configured for a PUCCH resource set of the BWP of the first communication node.

In the embodiment, the transmit power offset is determined by the sum of one reference amount of the transmit power offset and each correction amount of the transmit power offset.

The transmit power offset is used for all PUCCH resources in the PUCCH resource set of the BWP.

At least one transmit power offset is used for a payload size interval of the PUCCH, the number of transmit power offset being the same as the number of the payload size interval. For example, two transmit power offsets are respectively used for a large payload interval of the PUCCH and a small payload interval of the PUCCH.

In an embodiment, one reference amount of the transmit power offset is configured for the BWP of the first communication node, and at least one correction amount of the transmit power offset is configured for a PUCCH resource of the BWP of the first communication node.

In the embodiment, the transmit power offset is determined by the sum of one reference amount of the transmit power offset and each correction amount of the transmit power offset.

The transmit power offset is used for the PUCCH resource of the BWP.

At least one transmit power offset is used for a payload size interval of the PUCCH, the number of transmit power offset being the same as the number of the payload size interval. For example, two transmit power offsets are respectively used for a large payload interval of the PUCCH and a small payload interval of the PUCCH.

In an embodiment, one reference amount of the transmit power offset is configured for the PUCCH resource set, and at least one correction amount of the transmit power offset is configured for the PUCCH resource set.

In the embodiment, the transmit power offset of the PUCCH resource set is determined by the sum of the reference amount of the transmit power offset of the PUCCH resource set and the correction amount of the transmit power offset of the PUCCH resource set. The transmit power offset is used for all PUCCH resources in the PUCCH resource set.

In an embodiment, one reference amount of the transmit power offset is configured for the PUCCH resource set, and at least one correction amount of the transmit power offset is configured for a PUCCH resource in the PUCCH resource set.

In the embodiment, the transmit power offset of the PUCCH resource set is determined by the sum of the reference amount of the transmit power offset of the PUCCH resource set and the correction amount of the transmit power offset of the PUCCH resource set. The transmit power offset is used for the PUCCH resource in the PUCCH resource set.

In an embodiment, each transmit power offset corresponds to one payload size interval of the PUCCH.

In the embodiment, the first communication node selects a transmit power offset corresponding to an appropriate PUCCH payload interval according to an actual payload size of the PUCCH.

In an embodiment, the transmit power offset is the transmit power offset $\Delta_{TF}$ determined by a bit rate, and $\Delta_{TF}$ is defined according to different payload size intervals as different functions including at least one of the following independent variables: the number of OFDM symbols occupied by the PUCCH transmission, the number of RBs occupied by the PUCCH transmission, or whether the PUCCH is subjected to frequency hopping.

In the embodiment, the transmit power offset determined by whether the PUCCH is subjected to frequency hopping is predefined by the second communication node and the first communication node, or preconfigured by the second communication node.

As shown in FIG. 2, a power control apparatus is further provided in an embodiment of the present disclosure and includes a first configuration unit 201.

The first configuration unit 201 is configured to configure a power control parameter for a first communication node. The power control parameter includes at least one transmit power offset, and the transmit power offset is determined by at least one of: a payload size of a PUCCH transmission, the number of OFDM symbols occupied by the PUCCH transmission, the number of RBs occupied by the PUCCH transmission, or whether a PUCCH is subjected to frequency hopping.

In the embodiment, the transmit power offset may be configured for at least one of: a PUCCH resource of the first communication node, a PUCCH resource set of the first communication node, or a BWP of the first communication node.

In the embodiment, the transmit power is obtained by at least one of: a reference amount of the transmit power offset, or a sum of the reference amount of the transmit power offset and a correction amount of the transmit power offset.

In an embodiment, the correction amount of the transmit power offset is predefined.

In an embodiment, one reference amount of the transmit power offset is configured for the BWP of the first communication node, and at least one correction amount of the transmit power offset is configured for the BWP of the first communication node.

In an embodiment, one reference amount of the transmit power offset is configured for the BWP of the first communication node, and at least one correction amount of the transmit power offset is configured for a PUCCH resource set of the BWP of the first communication node.

In an embodiment, one reference amount of the transmit power offset is configured for the BWP of the first communication node, and at least one correction amount of the transmit power offset is configured for a PUCCH resource of the BWP of the first communication node.

In an embodiment, one reference amount of the transmit power offset is configured for the PUCCH resource set, and at least one correction amount of the transmit power offset is configured for the PUCCH resource set.

In an embodiment, one reference amount of the transmit power offset is configured for the PUCCH resource set, and at least one correction amount of the transmit power offset is configured for a PUCCH resource in the PUCCH resource set.

In an embodiment, each transmit power offset corresponds to one payload size interval of the PUCCH.

In an embodiment, the transmit power offset is the transmit power offset $\Delta_{TF}$ determined by a bit rate, and $\Delta_{TF}$ is defined according to different payload size intervals as different functions including at least one of the following independent variables: the number of OFDM symbols occupied by the PUCCH transmission, the number of RBs occupied by the PUCCH transmission, or whether the PUCCH is subjected to frequency hopping.

In the embodiment, the transmit power offset determined by whether the PUCCH is subjected to frequency hopping is predefined by the second communication node and the first communication node, or preconfigured by the second communication node.

As shown in FIG. 3, a power control method is further provided in an embodiment of the present disclosure and includes a step described below.

In step 301, a second communication node configures at least one spatial relationship for a BWP of a first communication node, and configures at least one set of power control parameters for each spatial relationship, where each set of power control parameters corresponds to a power influence factor set, and the power influence factor set includes at least one of following power influence factors: a payload size of a PUCCH transmission, the number of OFDM symbols occupied by the PUCCH transmission, the number of RBs occupied by the PUCCH transmission, or whether a PUCCH is subjected to frequency hopping.

In the embodiment, a power control parameter includes a target received power $P_0$ for the second communication node.

As shown in FIG. 4, a power control apparatus is further provided in an embodiment of the present disclosure and includes a second configuration unit 401. The second configuration unit 401 is configured to configure at least one spatial relationship for a BWP of a first communication node, and configure at least one set of power control parameters for each spatial relationship. Each set of power control parameters corresponds to a power influence factor set, and the power influence factor set includes at least one of the following power influence factors: a payload size of a PUCCH transmission, the number of OFDM symbols occupied by the PUCCH transmission, the number of RBs occupied by the PUCCH transmission, or whether a PUCCH is subjected to frequency hopping.

In the embodiment, a power control parameter includes a target received power $P_0$ for the second communication node.

A base station is further provided in an embodiment of the present disclosure and includes a processor and a memory, where the processor is configured to execute a power control program stored in the memory to implement steps in any power control method described above.

A computer-readable storage medium is further provided in an embodiment of the present disclosure. The computer-readable storage medium is configured to store one or more programs executable by one or more processors to implement steps in any power control method described above.

As shown in FIG. 5, a power control method is further provided in an embodiment of the present disclosure and includes steps described below.

In step 501, a first communication node receives a power control parameter from a second communication node, where the power control parameter includes at least one transmit power offset, and the transmit power offset is determined by at least one of: a payload size of a PUCCH transmission, the number of OFDM symbols occupied by the PUCCH transmission, the number of RBs occupied by the PUCCH transmission, or whether a PUCCH is subjected to frequency hopping.

In the embodiment, at least one transmit power offsets is configured for any of the following PUCCH formats: PUCCH format 2, PUCCH format 3, and PUCCH format 4. The at least one transmit power offset is used for a payload size interval of the PUCCH, a number of transmit power offset being the same as a number of the payload size interval. For example, two transmit power offsets are configured and correspond to a large payload interval of the PUCCH and a small payload interval of the PUCCH.

In an embodiment, the payload interval is predefined. For example, the large payload interval refers to an interval of more than 11 bits, and the small payload interval refers to an interval of 3 bits to 11 bits.

In the embodiment, the transmit power offset may be configured for at least one of: a PUCCH resource of the first communication node, a PUCCH resource set of the first communication node, or a BWP of the first communication node.

In an embodiment, when the transmit power offset is configured for the PUCCH resource set or the BWP, the PUCCH format is distinguished for configuring the transmit power offset. For one PUCCH format of the first communication node, at least one transmit power offsets needs to be configured.

It should be noted that a correspondence exists between PUCCH resources and PUCCH formats. Therefore, when a transmit power offset is configured for the PUCCH resource, the configuration is only performed for the PUCCH format corresponding to the PUCCH resource.

For one PUCCH resource of the first communication node, the power control parameter includes at least one transmit power offset. For example, at least one transmit power offset is configured for each PUCCH resource of part or all of the PUCCH resources, and the at least one transmit power offset corresponds to different payload size intervals for PUCCH transmission.

In the embodiment, the transmit power is obtained by at least one of: a reference amount of the transmit power offset, or a sum of the reference amount of the transmit power offset and a correction amount of the transmit power offset.

In an embodiment, the correction amount of the transmit power offset is predefined.

In an embodiment, one reference amount of the transmit power offset is configured for the BWP of the first communication node, and at least one correction amount of the transmit power offset is configured for the BWP of the first communication node.

In an embodiment of the present disclosure, one transmit power offset is determined by using one reference amount of the transmit power offset, and other transmit power offset is determined by the sum of the reference amount of the transmit power offset and each correction amount of the transmit power offset. Thus, a total number of transmit power offsets that can be determined is equal to one plus the number of correction amount of the transmit power offset.

In another embodiment of the present disclosure, the transmit power offset is determined by the sum of one reference amount of the transmit power offset and each correction amount of the transmit power offset, and thus a total number of transmit power offsets that can be determined is equal to the number of correction amount of the transmit power offset.

In the embodiment, the transmit power offset is used for all PUCCH resources of the BWP.

At least one transmit power offset is used for a payload size interval of the PUCCH, the number of transmit power offset being the same as the number of the payload size interval. For example, two transmit power offsets are respectively used for a large payload interval of the PUCCH and a small payload interval of the PUCCH.

In an embodiment, one reference amount of the transmit power offset is configured for the BWP of the first communication node, and at least one correction amount of the transmit power offset is configured for a PUCCH resource set of the BWP of the first communication node.

In the embodiment, the transmit power offset is determined by the sum of one reference amount of the transmit power offset and each correction amount of the transmit power offset.

The transmit power offset is used for all PUCCH resources in the PUCCH resource set of the BWP.

At least one transmit power offset is used for a payload size interval of the PUCCH, the number of transmit power offsets being the same as the number of the payload size interval. For example, two transmit power offsets are respectively used for a large payload interval of the PUCCH and a small payload interval of the PUCCH.

In an embodiment, one reference amount of the transmit power offset is configured for the BWP of the first communication node, and at least one correction amount of the transmit power offset is configured for a PUCCH resource of the BWP of the first communication node.

In the embodiment, the transmit power offset is determined by the sum of one reference amount of the transmit power offset and each correction amount of the transmit power offset.

The transmit power offset is used for the PUCCH resource of the BWP.

At least one transmit power offset is used for a payload size interval of the PUCCH, the number of transmit power offsets being the same as the number of the payload size interval. For example, two transmit power offsets are respectively used for a large payload interval of the PUCCH and a small payload interval of the PUCCH.

In an embodiment, one reference amount of the transmit power offset is configured for the PUCCH resource set, and at least one correction amount of the transmit power offset is configured for the PUCCH resource set.

In the embodiment, the transmit power offset of the PUCCH resource set is determined by the sum of the reference amount of the transmit power offset of the PUCCH resource set and the correction amount of the transmit power offset of the PUCCH resource set. The transmit power offset is used for all PUCCH resources in the PUCCH resource set.

In an embodiment, one reference amount of the transmit power offset is configured for the PUCCH resource set, and at least one correction amount of the transmit power offset is configured for a PUCCH resource in the PUCCH resource set.

In the embodiment, the transmit power offset of the PUCCH resource set is determined by the sum of the reference amount of the transmit power offset of the PUCCH resource set and the correction amount of the transmit power offset of the PUCCH resource set. The transmit power offset is used for the PUCCH resource in the PUCCH resource set.

In an embodiment, each transmit power offset corresponds to one payload size interval of the PUCCH.

In the embodiment, the first communication node selects a transmit power offset corresponding to an appropriate PUCCH payload interval according to an actual payload size of the PUCCH.

In the embodiment, the transmit power offset is the transmit power offset $\Delta_{TF}$ determined by a bit rate, and $\Delta_{TF}$ is defined according to different payload size intervals as different functions including at least one of the following independent variables: the number of OFDM symbols occupied by the PUCCH transmission, the number of RBs occupied by the PUCCH transmission, or whether the PUCCH is subjected to frequency hopping.

In the embodiment, the transmit power offset determined by whether the PUCCH is subjected to frequency hopping is predefined, or preconfigured by the second communication node.

In step 502, the first communication node determines a transmit power of the PUCCH according to an actual PUCCH transmission parameter.

As shown in FIG. 6, a power control method is further provided in an embodiment of the present disclosure and includes steps described below.

In step 601, a first communication node receives a spatial relationship configured by a second communication node for a BWP of the first communication node, and receives at least one set of power control parameters configured by the second receiving node for each spatial relationship, where each set of power control parameters corresponds to a power influence factor set, and the power influence factor set includes at least one of the following power influence factors: a payload size of a PUCCH transmission, a number of OFDM symbols occupied by the PUCCH transmission, a number of RBs occupied by the PUCCH transmission, or whether a PUCCH is subjected to frequency hopping. In the embodiment, the power control parameter includes a target received power $P_0$ for the second communication node.

In step 602, the first communication node determines a transmit power of the PUCCH according to an actual PUCCH transmission parameter.

A terminal is further provided in an embodiment of the present disclosure and includes a processor and a memory, where the processor is configured to execute a power control program stored in the memory to implement steps in any power control method described above.

A computer-readable storage medium is further provided in an embodiment of the present disclosure. The computer-readable storage medium is configured to store one or more programs executable by one or more processors to implement steps in any power control method described above.

As shown in FIG. 7, a power control apparatus is further provided in an embodiment of the present disclosure and includes a first receiving unit 701 and a first determination unit 702.

The first receiving unit 701 is configured to receive a power control parameter from a second communication node. The power control parameter includes at least one transmit power offset, and the transmit power offset is determined by at least one of: a payload size of a PUCCH transmission, a number of OFDM symbols occupied by the PUCCH transmission, a number of RBs occupied by the PUCCH transmission, or whether a PUCCH is subjected to frequency hopping.

The first determination unit 702 is configured to determine a transmit power of the PUCCH according to an actual PUCCH transmission parameter.

In this embodiment, the transmit power offset may be configured for at least one of: a PUCCH resource of the first communication node, a PUCCH resource set of the first communication node, or a BWP of the first communication node.

In the embodiment, the transmit power is obtained by at least one of: a reference amount of the transmit power offset, or a sum of the reference amount of the transmit power offset and a correction amount of the transmit power offset.

In an embodiment, the correction amount of the transmit power offset is predefined.

In an embodiment, one reference amount of the transmit power offset is configured for the BWP of the first communication node, and at least one correction amount of the transmit power offset is configured for the BWP of the first communication node.

In an embodiment, one reference amount of the transmit power offset is configured for the BWP of the first communication node, and at least one correction amount of the transmit power offset is configured for a PUCCH resource set of the BWP of the first communication node.

In an embodiment, one reference amount of the transmit power offset is configured for the BWP of the first communication node, and at least one correction amount of the transmit power offset is configured for a PUCCH resource of the BWP of the first communication node.

In an embodiment, one reference amount of the transmit power offset is configured for the PUCCH resource set, and at least one correction amount of the transmit power offset is configured for the PUCCH resource set.

In an embodiment, one reference amount of the transmit power offset is configured for the PUCCH resource set, and at least one correction amount of the transmit power offset is configured for a PUCCH resource in the PUCCH resource set.

In an embodiment, each transmit power offset corresponds to one payload size interval of the PUCCH.

In an embodiment, the transmit power offset is the transmit power offset $\Delta_{TF}$ determined by a bit rate, and $\Delta_{TF}$ is defined according to different payload size intervals as different functions including at least one of the following independent variables: the number of OFDM symbols occupied by the PUCCH transmission, the number of RBs occupied by the PUCCH transmission, or whether the PUCCH is subjected to frequency hopping.

In the embodiment, the transmit power offset determined by whether the PUCCH is subjected to frequency hopping is predefined, or preconfigured by the second communication node.

As shown in FIG. 8, a power control apparatus is further provided in an embodiment of the present disclosure and includes a second receiving unit 801 and a second determination unit 802.

The second receiving unit 801 is configured to receive a spatial relationship configured by a second communication node for a BWP of an apparatus to which the second receiving unit belongs, and receive at least one set of power control parameters configured by the second receiving node for each spatial relationship. Each set of power control parameters corresponds to a power influence factor set, and the power influence factor set includes at least one of the following power influence factors: a payload size of a PUCCH transmission, a number of OFDM symbols occupied by the PUCCH transmission, a number of RBs occupied by the PUCCH transmission, or whether a PUCCH is subjected to frequency hopping.

The second determination unit 802 is configured to determine a transmit power of the PUCCH according to an actual PUCCH transmission parameter.

In the embodiment, the power control parameter includes a target received power $P_0$ for the second communication node.

As shown in FIG. 9, a power control method is further provided in the present disclosure and includes a step described below.

In step 901, a power control parameter of a PUSCH is determined according to a power control parameter of a PUCCH, where a determination approach includes at least one of: determining an open-loop power control parameter of the PUSCH according to an open-loop power control parameter of the PUCCH; determining an RS parameter of a PL of the PUSCH according to an RS parameter of a PL of the PUCCH; or determining a closed-loop power control parameter of the PUSCH according to a closed-loop power control parameter of the PUCCH.

The PUCCH has at least one of the following characteristics: the PUCCH being determined by a predetermined PUCCH resource (e.g., a PUCCH resource with the smallest PUCCH resource index); the PUCCH being recently configured or recently sent; or the PUCCH being in a cell or BWP associated with the PUSCH. In an embodiment, the PUCCH may be a recently configured or sent PUCCH in a cell or BWP associated with the PUSCH, or a PUCCH of a predetermined PUCCH resource in a cell or BWP associated with the PUSCH.

A recent configuration of the PUCCH includes one of: configuration of a newest spatial relationship of the PUCCH activated by the MAC CE, reconfiguration of the spatial relationship of the PUCCH by RRC signaling, or reconfiguration of the power control parameter of the PUCCH by RRC signaling.

The cell associated with the PUSCH refers to one of: a primary cell, or a primary secondary cell (PSCell) of a secondary cell group (SCG), or a PUCCH secondary cell (SCell) configured to send a PUCCH.

The BWP associated with the PUSCH refers to one of: the BWP activated in the primary cell, or the BWP activated in the PSCell of the SCG, or the BWP activated in the PUCCH SCell configured to send the PUCCH.

In an embodiment, the cell or BWP associated with the PUSCH and a cell or BWP to which the PUSCH belongs are within a same PUCCH group.

The step of determining the open-loop power control parameter of the PUSCH according to the open-loop power control parameter of the PUCCH includes: determining the open-loop power control parameter of the PUSCH by using the open-loop power control parameter of the PUCCH and a deviation between the open-loop power control parameter of the PUCCH and the open-loop power control parameter of the PUSCH.

The deviation between the open-loop power control parameter of the PUCCH and the open-loop power control parameter of the PUSCH at least includes a deviation of a target received power P0. The deviation value is determined in a manner of configuration by a base station or n a manner of predefinition.

When the PUSCH determines the open-loop power control parameter of the PUSCH by using the open-loop power control parameter of the PUCCH, a pathloss factor α of the PUSCH is 1.

In an embodiment, the step of determining the closed-loop power control parameter of the PUSCH according to the closed-loop power control parameter of the PUCCH includes at least one of: whether cumulative closed-loop power control is enabled, or determining a UE-local closed-loop power adjustment amount of the PUSCH according to a UE-local closed-loop power adjustment amount of the PUCCH.

In an embodiment, the step of determining the UE-local closed-loop power adjustment amount of the PUSCH according to the UE-local closed-loop power adjustment amount of the PUCCH includes at least one of: using the UE-local closed-loop power adjustment amount of the PUCCH as the UE-local closed-loop power adjustment amount of the PUSCH; at a preset moment, using the closed-loop power control parameter of the PUCCH as the closed-loop power control parameter of the PUSCH, and after the preset moment, the PUSCH using a UE-local closed-loop power adjustment amount maintained independently for the PUSCH; when the UE-local closed-loop power adjustment amount of the PUCCH is greater than a preset threshold, determining the UE-local closed-loop power adjustment amount of the PUSCH according to the UE-local closed-loop power adjustment amount of the PUCCH; or when a UE-local closed-loop power adjustment amount of the PUCCH is greater than a preset threshold at a preset moment, using the closed-loop power control parameter of the PUCCH as the closed-loop power control parameter of the PUSCH, and after the preset moment, the PUSCH using a UE-local closed-loop power adjustment amount maintained independently for the PUSCH.

In an embodiment, the preset moment refers to one of: a moment when the PUSCH is scheduled by DCI format 0-0 for a first time; a moment when scheduling the PUSCH by a DCI which is not DCI format 0-0 is converted into scheduling the PUSCH by DCI format 0-0; a moment when a current spatial relationship of the PUCCH changes; or a moment when the PUSCH is scheduled by DCI format 0-0 after the current spatial relationship of the PUCCH changes.

The format 0-0 of DCI is a format of downlink control information for scheduling PUSCH transmission, and does not include an SRI domain. A format 0-1 of DCI is another format of downlink control information for scheduling PUSCH transmission, and includes the SRI domain.

A terminal is further provided in the present disclosure and includes a processor and a memory, where the processor is configured to execute a power control program stored in the memory to implement steps in any power control method described above.

A computer-readable storage medium is further provided in the present disclosure. The computer-readable storage medium is configured to store one or more programs executable by one or more processors to implement steps in any power control method described above.

A power control apparatus is further provided in the present disclosure and includes a fourth determination unit.

The fourth determination unit is configured to determine a power control parameter of a PUSCH according to a power control parameter of a PUCCH, where a determination approach includes at least one of: determining an open-loop power control parameter of the PUSCH according to an open-loop power control parameter of the PUCCH; determining an RS parameter of a PL of the PUSCH according to an RS parameter of a PL of the PUCCH; or determining a closed-loop power control parameter of the PUSCH according to a closed-loop power control parameter of the PUCCH.

The PUCCH has at least one of the following characteristics: the PUCCH being determined by a predetermined PUCCH resource (e.g., a PUCCH resource with the smallest PUCCH resource index); the PUCCH being recently configured or recently sent; or the PUCCH being in a cell or BWP associated with the PUSCH. In an embodiment, the PUCCH may be a recently configured or sent PUCCH in a cell or BWP associated with the PUSCH, or a PUCCH of a predetermined PUCCH resource in a cell or BWP associated with the PUSCH.

A recent configuration of the PUCCH includes one of: configuration of a newest spatial relationship of the PUCCH activated by the MAC CE, reconfiguration of the spatial relationship of the PUCCH by RRC signaling, or reconfiguration of the power control parameter of the PUCCH by RRC signaling.

The cell associated with the PUSCH refers to one of: a primary cell, or a primary secondary cell (PSCell) of a secondary cell group (SCG), or a PUCCH secondary cell (SCell) configured to send a PUCCH.

The BWP associated with the PUSCH refers to one of: the BWP activated in the primary cell, or the BWP activated in the PSCell of the SCG, or the BWP activated in the PUCCH SCell configured to send the PUCCH.

In an embodiment, the cell or BWP associated with the PUSCH and a cell or BWP to which the PUSCH belongs are within a same PUCCH group.

The step of determining the open-loop power control parameter of the PUSCH according to the open-loop power control parameter of the PUCCH includes: determining the open-loop power control parameter of the PUSCH by using the open-loop power control parameter of the PUCCH and a deviation between the open-loop power control parameter of the PUCCH and the open-loop power control parameter of the PUSCH.

In an embodiment, the step of determining the closed-loop power control parameter of the PUSCH according to the closed-loop power control parameter of the PUCCH includes at least one of: whether cumulative closed-loop power control is enabled, or determining a UE-local closed-loop power adjustment amount of the PUSCH according to a UE-local closed-loop power adjustment amount of the PUCCH.

In an embodiment, the step of determining the UE-local closed-loop power adjustment amount of the PUSCH according to the UE-local closed-loop power adjustment amount of the PUCCH includes at least one of: using the UE-local closed-loop power adjustment amount of the PUCCH as the UE-local closed-loop power adjustment amount of the PUSCH; at a preset moment, using the closed-loop power control parameter of the PUCCH as the closed-loop power control parameter of the PUSCH, and after the preset moment, the PUSCH using a UE-local closed-loop power adjustment amount maintained independently for the PUSCH; when the UE-local closed-loop power adjustment amount of the PUCCH is greater than a preset threshold, determining the UE-local closed-loop power adjustment amount of the PUSCH by the UE-local closed-loop power adjustment amount of the PUCCH; or when a UE-local closed-loop power adjustment amount of the PUCCH is greater than a preset threshold at a preset moment, using the closed-loop power control parameter of the PUCCH as the closed-loop power control parameter of the PUSCH, and after the preset moment, the PUSCH using a UE-local closed-loop power adjustment amount maintained independently for the PUSCH.

In an embodiment, the preset moment refers to one of: a moment when the PUSCH is scheduled by DCI format 0-0 for a first time; a moment when scheduling the PUSCH by a DCI which is not DCI format 0-0 is converted into scheduling the PUSCH by DCI format 0-0; a moment when a current spatial relationship of the PUCCH changes; or a moment when the PUSCH is scheduled by DCI format 0-0 after the current spatial relationship of the PUCCH changes.

Embodiment One

A base station configures a power control parameter of a PUCCH for a UE, and the power control parameter is $\Delta_{F\_PUCCH}$ (F) configured for a PUCCH resource, or a reference amount of $\Delta_{F\_PUCCH}$ (F) and a correction amount of $\Delta_{F\_PUCCH}$ (F). $\Delta_{F\_PUCCH}$ (F) denotes a transmit power offset.

The transmit power offset can also be divided into two parts for configuration: the reference amount of the transmit power offset and the correction amount of the transmit power offset.

The transmit power offset can be obtained by summing the correction amount of the transmit power offset and the reference amount of the transmit power offset.

Alternatively, the correction amount of the transmit power offset may be the transmit power offset.

A PUCCH format, a starting position of RBs, a number of RBs, a starting position of OFDM symbols, a number of OFDM symbols, and whether frequency hopping is performed are configured in the PUCCH resource, so the base station can configure $\Delta_{F\_PUCCH}$ (F) or configure the reference amount of $\Delta_{F\_PUCCH}$ (F) and the correction amount of $\Delta_{F\_PUCCH}$ (F) for the PUCCH resource according to at least one of the above parameters.

Although the base station cannot determine a payload during actual transmission when configuring parameters, the base station configures a maximum payload size on a PUCCH resource set, so each PUCCH resource in the PUCCH resource set also has a corresponding payload range. Therefore, the base station may also configure $\Delta_{F\_PUCCH}$ (F) or configure the reference amount of $\Delta_{F\_PUCCH}$ (F) and the correction amount of $\Delta_{F\_PUCCH}$ (F) for the PUCCH resource according to the payload range of the PUCCH resource.

The base station may also configure N $\Delta_{F\_PUCCH}$ (F), or N correction amounts of $\Delta_{F\_PUCCH}$ (F) each PUCCH resource, the N $\Delta_{F\_PUCCH}$ (F) or N correction amounts of $\Delta_{F\_PUCCH}$ (F) respectively corresponding to different payload intervals. N is an integer greater than or equal to 1. According to the actual payload size for PUCCH transmission, the UE selects one of the N $\Delta_{F\_PUCCH}$ (F) or one of N correction amounts of $\Delta_{F\_PUCCH}$ (F) and the reference amount of $\Delta_{F\_PUCCH}$ (F) to perform power control of the PUCCH.

The payload interval may be a preconfigured fixed value. For example, [3, 11] indicates a payload range of 3 bits to 11 bits.

The payload interval may alternatively be determined according to a data rate or a coding rate.

For example, the maximum payload size configured on the PUCCH resource set is in a large range. Within the corresponding payload range, more than one $\Delta_{F\_PUCCH}$ (F) may need to be configured and corresponding to multiple payload ranges respectively. For example, the maximum payload size on the PUCCH resource set is 100 bits. Three $\Delta_{F\_PUCCH}$ (F) are configured for one PUCCH resource in the PUCCH resource set and correspond to three payload size intervals respectively, for example, three payload size intervals are for bits the number of which is in the range of [3, 11], [12, 22], and [23, +∞]. When the payload carried by the PUCCH sent by the UE is 10 bits, $\Delta_{F\_PUCCH}$ (F) corresponding to the first payload interval is selected.

For another example, the base station configures the UE with three PUCCH resource sets, and each resource set is independently configured with a maximum payload size. The maximum payload size of a first PUCCH resource set is 2 bits, the maximum payload size of a second PUCCH resource set is 11 bits, and the maximum payload size of a third PUCCH resource set is 100 bits. Then the UE combines the plurality of PUCCH resource sets to determine the PUCCH resource set used by a specific PUCCH. The payload sizes in the first PUCCH resource set are 1 bit and 2 bits; the payload sizes in the second PUCCH resource set are 3 bits to 11 bits; and the payload sizes in the third PUCCH resource set are 12 bits to 100 bits. If the actual payload of the PUCCH is 20 bits, the third PUCCH resource set should be selected.

When the base station is configured with the correction amount of $\Delta_{F\_PUCCH}$ (F), the correction amount of $\Delta_{F\_PUCCH}$ (F) needs to be combined with the reference amount of $\Delta_{F\_PUCCH}$ (F) to determine $\Delta_{F\_PUCCH}$ (F) during the power control of the PUCCH. Therefore, the base station also needs to configure the reference amount of $\Delta_{F\_PUCCH}$ (F) for the UE.

For example, the base station configures the reference amount of $\Delta_{F\_PUCCH}$ (F) on the BWP for each PUCCH format. Then the reference amount of $\Delta_{F\_PUCCH}$ (F) is used for all PUCCH resources on the BWP. The actual $\Delta_{F\_PUCCH}$ (F) is jointly determined by the reference amount of $\Delta_{F\_PUCCH}$ (F) and the corresponding correction amount of $\Delta_{F\_PUCCH}$ (F) configured for the PUCCH resource. For example, $\Delta_{F\_PUCCH}$ (F) is equal to a reference amount of $\Delta_{F\_PUCCH}$ (F) plus a correction amount of $\Delta_{F\_PUCCH}$ (F).

Embodiment Two

The step in which a base station configures a power control parameter of a PUCCH for a UE includes configuring N $\Delta_{F\_PUCCH}$ (F), or configuring a reference amount of $\Delta_{F\_PUCCH}$ (F) and N correction amounts of $\Delta_{F\_PUCCH}$ (F). The N $\Delta_{F\_PUCCH}$ (F) or N correction amounts of $\Delta_{F\_PUCCH}$ (F) correspond to different payload intervals respectively. N is an integer greater than or equal to 1. According to the actual payload size for PUCCH transmission, the UE selects one of the N $\Delta_{F\_PUCCH}$ (F) or one of the N correction amounts of $\Delta_{F\_PUCCH}$ (F) to perform power control of the PUCCH.

Since the maximum payload size is configured on the PUCCH resource set, the set-based configured $\Delta_{F\_PUCCH}$ (F) can embody the difference in payload.

For example, when N is 2, a large payload interval and a small payload interval are correspondingly provided. The boundary of the payload intervals may be predefined, for example, an interval having more than 11 bits is called a large payload interval, and an interval having less than 11 bits is called a small payload interval. The boundary of the payload intervals may also be determined according to the bit rate or coding rate and the number of RBs.

For another example, when N is 3, three types of payload are correspondingly provided. The first payload interval is the interval having more than 22 bits, the second payload interval is the interval having more than 11 bits and less than or equal to 22 bits, and the third payload interval is the interval having less than 11 bits.

In addition to the payload factor, the number of OFDM symbols occupied by the PUCCH resource, the number of RBs occupied by the PUCCH resource, whether frequency hopping is performed and other factors should also be embodied in the power control formula. The BPRE itself may embody the bit rate, i.e., is the comprehensive embodiment of payload, the number of OFDM symbols and the number of RBs, but these factors also need to be adjusted according to different scenarios.

$\Delta_{TF,f,c}$ (i), or $\Delta_{F\_PUCCH}$ (F), or an independent item in the power formula embodies at least one of: the number of OFDM symbols occupied by the PUCCH resource, the number of RBs occupied by the PUCCH resource, or whether the PUCCH resource is subjected to frequency hopping. $\Delta_{TF,f,c}$ (i) and $\Delta_{F\_PUCCH}$ (F) denote a transmit power offset.

The deviation resulted from whether frequency hopping is performed may be predefined or configured.

For example, the deviation introduced by frequency hopping is configured by the base station or predefined to be 2 dB. Such difference will be embodied in $\Delta_{TF,f,c}$(i), or $\Delta_{F\_PUCCH}$ (F), or an independent item in the power formula. If the frequency hopping is on, the transmit power is reduced by 2 dB relative to the transmit power when the frequency hopping is not on.

The deviation caused by the number of OFDM symbols occupied by the PUCCH resource is a function of the number of OFDM symbols occupied by the PUCCH resource.

For example, the function is $4 \log_{10}(N_{symb}^{PUCCH}(i))$. $N_{symb}^{PUCCH}(i)$ is the number of OFDM symbols. The function may be used as a part of $\Delta_{TF,f,c}$ (i), $\Delta_{F\_PUCCH}$ (F) or the independent item of the power formula to embody the influence of the number of OFDM symbols occupied by the PUCCH resource on power control.

The deviation caused by the number of RBs occupied by the PUCCH resource is a function of the number of RBs occupied by the PUCCH resource.

For example, the function is $-2 \log_{10}(M_{PUCCH,c}(i))$. $M_{PUCCH,c}(i)$ is the number of RBs. The function may be used as a part of $\Delta^{TF,f,c}$ (i), $\Delta_{F\_PUCCH}$ (F) or the independent item of the power formula to embody the influence of the number of RBs occupied by the PUCCH resource on power control.

The independent item in the power formula refers to a newly added item instead of an existing item in the related power formula.

For example, Table 1 is an example illustrating adjustment amounts of the number of OFDM symbols and the number of RBs in $\Delta_{F\_PUCCH}(F)$ in PUCCH formats 2, 3 and 4. Table 2 is an example illustrating adjustment amounts of the number of OFDM symbols and the number of RBs in $\Delta_{TF,f,c}$ in PUCCH formats 2, 3 and 4.

TABLE 1

| Format | $\Delta_{F\_PUCCH}(F)$ [dB] | $\Delta_{TF,f,c}(i)$ [dB] |
|---|---|---|
| 2 | $6 - 2\log_{10}(M_{PUCCH,c}(i)) + 4\log_{10}(N_{symb}^{PUCCH}(i))$ | $10\log_{10}(K2 \cdot BPRE)$, K2 = 1.8 for Ouci(i) <= 11 bits; |
| 3 or 4 | $4 - 2\log_{10}(M_{PUCCH,c}(i)) + 4\log_{10}(N_{symb}^{PUCCH}(i))$ | $10\log_{10}(2^{K1 \cdot BPRE} - 1)$, K1 = 1.25, for Ouci(i) > 11 bits |

Ouci (i) denotes the payload length of the i-th uplink subframe.

TABLE 2

| Format | $\Delta_{F\_PUCCH}(F)$ [dB] | $\Delta_{TF,f,c}(i)$ [dB] |
|---|---|---|
| 2 | 6 | $10\log_{10}(K2 \cdot BPRE) - 2\log_{10}(M_{PUCCH,c}(i)) + 4\log_{10}(N_{symb}^{PUCCH}(i))$, K2 = 1.8, for Ouci(i) <= 11 bits |
| 3 or 4 | 4 | $10\log_{10}(2^{K1 \cdot BPRE} - 1) - 2\log_{10}(M_{PUCCH,c}(i)) + 4\log_{10}(N_{symb}^{PUCCH}(i))$, K1 = 1.25, for Ouci(i) > 11 bits |

Embodiment Three

The step in which a base station configures a power control parameter of a PUCCH includes configuring N $\Delta_{F\_PUCCH}(F)$ for a BWP, N $\Delta_{F\_PUCCH}(F)$ corresponding to different payload intervals respectively. N is an integer greater than or equal to 1. According to the actual payload size for PUCCH transmission, the UE selects one of the N $\Delta_{F\_PUCCH}(F)$ to perform power control of the PUCCH.

For example, when N is 2, a large payload interval and a small payload interval are correspondingly provided. For example, an interval of more than 11 bits is referred to as the large payload interval, and an interval of less than or equal to 11 bits is referred to as the small payload interval.

For example, the base station configures one CC for the UE, the one CC includes three BWPs, and PUCCH configuration exists on the first BWP. Two $\Delta_{F\_PUCCH}(F)$ are configured on the BWP and correspond to the large payload interval and the small payload interval respectively.

In addition to the payload factor, the number of OFDM symbols occupied by the PUCCH resource, the number of RBs occupied by the PUCCH resource, whether frequency hopping is performed and other factors should also be embodied in the power control formula. The BPRE itself may embody the bit rate, i.e., is the comprehensive embodiment of payload, the number of OFDM symbols and the number of RBs, but these factors also need to be adjusted according to different scenarios.

$\Delta_{TF,f,c}(i)$, or $\Delta_{F\_PUCCH}(F)$, or an independent item in the power formula embodies at least one of: the number of OFDM symbols occupied by the PUCCH resource, the number of RBs occupied by the PUCCH resource, or whether the PUCCH resource is subjected to frequency hopping.

Detailed descriptions of whether frequency hopping is performed, the number of OFDM symbols occupied by the PUCCH resource, and the number of RBs occupied by the PUCCH resource are the same as detailed descriptions in embodiment two.

When the base station configures one $\Delta_{F\_PUCCH}(F)$ on the BWP for the UE, $\Delta_{F\_PUCCH}(F)$ is a basic $\Delta_{F\_PUCCH}(F)$ value, and an actual $\Delta_{F\_PUCCH}(F)$ value is jointly determined by the correction amount of $\Delta_{F\_PUCCH}(F)$ and the reference amount of $\Delta_{F\_PUCCH}(F)$.

The correction amount of $\Delta_{F\_PUCCH}(F)$ is predefined. The correction amount of $\Delta_{F\_PUCCH}(F)$ embodies the difference between different payload intervals. According to the actual payload size for PUCCH transmission, the UE selects one correction amount of $\Delta_{F\_PUCCH}(F)$ and the reference amount of $\Delta_{F\_PUCCH}(F)$ to perform power control of the PUCCH.

For example, for PUCCH format 2, the reference amount of $\Delta_{F\_PUCCH}(F)$ is configured to be 4 dB. The difference between different payload intervals is predefined. For example, the correction amount of $\Delta_{F\_PUCCH}(F)$ for the large payload interval is 3 dB, and the correction amount of $\Delta_{F\_PUCCH}(F)$ for the small payload interval is 1 dB.

The correction amount of $\Delta_{F\_PUCCH}(F)$ is configured by the base station. The correction amount of $\Delta_{F\_PUCCH}(F)$ embodies the difference between different payload intervals. According to the actual payload size for PUCCH transmission, the UE selects one correction amount of $\Delta_{F\_PUCCH}(F)$ and the reference amount of $\Delta_{F\_PUCCH}(F)$ to perform power control of the PUCCH. The step includes that the base station configures N correction amounts of $\Delta_{F\_PUCCH}(F)$ on the BWP for the UE, the N correction amounts of $\Delta_{F\_PUCCH}(F)$ corresponding to N different payload intervals respectively.

For example, for PUCCH format 2, the reference amount of $\Delta_{F\_PUCCH}(F)$ is configured to be 4 dB. The base station configures N (where N=2) correction amounts of $\Delta_{F\_PUCCH}(F)$ on the BWP for the UE, the two correction amounts of $\Delta_{F\_PUCCH}(F)$ corresponding to two different payload intervals respectively. For example, the correction amount of $\Delta_{F\_PUCCH}(F)$ for the large payload interval is 3 dB, and the correction amount of $\Delta_{F\_PUCCH}(F)$ for the small payload interval is 1 dB.

The correction amount of $\Delta_{F\_PUCCH}(F)$ is configured by the base station. The correction amount of $\Delta_{F\_PUCCH}(F)$ embodies the difference between different payload intervals. According to the actual payload size for PUCCH transmission, the UE selects one correction amount of $\Delta_{F\_PUCCH}(F)$ and the reference amount of $\Delta_{F\_PUCCH}(F)$ to perform power control of the PUCCH. The step includes that the base station configures N correction amounts of $\Delta_{F\_PUCCH}(F)$ for a PUCCH resource set of the UE, the N correction amounts of $\Delta_{F\_PUCCH}(F)$ corresponding to N different payload intervals respectively.

The correction amount of $\Delta_{F\_PUCCH}(F)$ is configured by the base station. The correction amount of $\Delta_{F\_PUCCH}(F)$ embodies the difference between different payload intervals. According to the actual payload size for PUCCH transmission, the UE selects one correction amount of $\Delta_{F\_PUCCH}(F)$ and the reference amount of $\Delta_{F\_PUCCH}(F)$ to perform power control of the PUCCH. The step includes that the base station configures N correction amounts of $\Delta_{F\_PUCCH}(F)$ for a PUCCH resource of the UE, the N correction amounts of $\Delta_{F\_PUCCH}(F)$ corresponding to N different payload intervals respectively.

The correction amount of $\Delta_{F\_PUCCH}(F)$ is configured by the base station. The correction amount of $\Delta_{F\_PUCCH}(F)$ embodies the difference between at least one of: the numbers of RBs occupied by the PUCCH resource, the numbers of symbols occupied by the PUCCH resource, whether frequency hopping is performed, or different payload intervals.

The UE performs power control of the PUCCH by selecting one correction amount of $\Delta_{F\_PUCCH}$ (F) and reference amount of $\Delta_{F\_PUCCH}$ (F) according to at least one of the following in the actual PUCCH transmission: the number of RBs occupied by the PUCCH resource, the number of symbols occupied by the PUCCH resource, whether frequency hopping is performed, or payload sizes in different payload intervals.

The correction amount of $\Delta_{F\_PUCCH}$ (F) is configured by one of the methods described below:
the base station configures N correction amounts of $\Delta_{F\_PUCCH}$ (F) for the PUCCH resource of the UE;
the base station configures N correction amounts of $\Delta_{F\_PUCCH}$ (F) for the PUCCH resource set of the UE;
the base station configures N correction amounts of $\Delta_{F\_PUCCH}$ (F) for the BWP of the UE.

Embodiment Four

A step in which a base station configures a power control parameter of a PUCCH for a UE includes: configuring M spatial relationships for a BWP, each spatial relationship corresponding to Mn (Mn sets of) power control parameters.

M is an integer greater than or equal to 1. Mn is an integer greater than or equal to 1.

The spatial relationship may also be replaced by reference signal information.

The power control parameter includes at least one of: at least one open-loop power control parameter set or open-loop power control parameter set index, at least one pathloss measurement parameter set or pathloss measurement parameter set index, or at least one closed-loop power control process parameter or closed-loop power control process index.

The reference signal information includes at least one of: at least one reference signal or reference signal index, at least one reference signal resource or reference signal resource index, at least one spatial relationship information or spatial relationship information index, at least one reference signal resource group or reference signal resource group index, or at least one reference signal resource combination or reference signal resource combination index.

The open-loop power control parameter set includes at least one of: target received power (P0) or pathloss factor (a).

The pathloss measurement parameter set includes at least one of: a reference signal resource type indication for pathloss measurement, a reference signal resource indication for pathloss measurement, or a processing rule for pathloss values of two or more reference signals for pathloss measurement.

The closed-loop power control process parameter includes at least one of: a closed-loop power control process identification set or the number of closed-loop power control processes.

The values of Mn for respective spatial relationships may be different.

Mn power control parameters of one spatial relationship respectively represent Mn power influence factor sets.

The power influence factor set includes at least one of: a payload interval, the number of RBs occupied by the PUCCH, the number of OFDM symbols occupied by the PUCCH, or whether frequency hopping is performed.

The UE determines the power influence factor set according to the actual PUCCH transmission parameters, and selects one (one set) from Mn power control parameters.

For example, the base station configures a CC and a BWP for the UE, and configures a plurality of PUCCH resource sets for the BWP, each resource set including a plurality of PUCCH resources.

The power influence factor set includes the payload interval. Only two payload intervals exist and are respectively a large payload interval and a small payload interval. Then, the number of power control influence factor sets is 2.

The base station configures a plurality of spatial relationships for the BWP, and each spatial relationship corresponds to Mn (Mn sets of) power control parameters. The power control parameter at least includes an open-loop power control parameter, and the open-loop power control parameter at least includes P0. The magnitude of Mn is determined according to the number of power control influence factor sets to be 2.

The UE determines the power influence factor set according to the actual PUCCH transmission parameters, and selects one (one set) from Mn power control parameters. For example, the payload for PUCCH transmission is 9 bits and corresponds to a small payload interval, and then the UE selects the power control parameter corresponding to the small payload interval from Mn (where Mn=2) power control parameters in the BWP of the corresponding CC, the power control parameter, for example, being P0 corresponding to the small payload interval.

Embodiment Five

A base station schedules a PUSCH by sending DCI to a UE. When an SRI domain exists in the DCI, a power control parameter is obtained through the SRI. When no SRI exists in the DCI, the power control parameter of the PUSCH cannot be indicated by the SRI indicated in the DCI. The present disclosure provides a method to solve this problem.

The step of determining the power control parameter of the PUSCH according to the power control parameter of the PUCCH may include at least one of the steps described below.

A set of power control parameters is configured for the PUCCH, and then the power control parameter of the PUCCH is used for the PUSCH.

At least one set of power control parameters is configured for the PUCCH, and one set among the at least one set of power control parameters is determined in a predefinition manner for the case where the spatial relationship is unknown, and then the one set of power control parameters predefined for the PUCCH is used for the PUCCH. For example, the predefinition manner includes at least one of: the power control parameter with the smallest serial number among the power control parameters, or the power control parameter with the specified serial number among the power control parameters.

At least one set of power control parameters is configured for the PUCCH, the association between the spatial relationship and the power control parameter of the PUCCH is configured, and one set among the at least one set of power control parameters is determined in a predefinition manner for the case where the spatial relationship is unknown, and then the one set of power control parameters predefined for the PUCCH is used for the PUCCH. For example, the predefinition manner includes at least one of: the power control parameter associated with the spatial relationship with the smallest serial number and the power control parameter associated with the spatial relationship with the specified serial number.

At least one set of power control parameters is configured for the PUCCH, the association between the spatial relationship and the power control parameter of the PUCCH is configured, and then the spatial relationship of the PUCCH is used to index one set of power control parameters of the PUCCH for determining the power control parameters of the PUSCH.

The power control parameter includes at least one of: at least one open-loop power control parameter set or open-loop power control parameter set index, at least one pathloss measurement parameter set or pathloss measurement parameter set index, or at least one closed-loop power control process parameter or closed-loop power control process index.

The open-loop power control parameter set includes at least one of: target received power or a pathloss factor.

The pathloss measurement parameter set includes at least one of: a reference signal resource type indication for pathloss measurement, a reference signal resource indication for pathloss measurement, or a processing rule for pathloss values of two or more reference signals for pathloss measurement.

The closed-loop power control process parameter includes at least one of: a closed-loop power control process identification set or the number of closed-loop power control processes.

Which spatial relationship of the PUCCH to use is determined in a following manner: a spatial relationship indicated by high-layer signaling, and/or MAC CE, and/or physical layer signaling for use in the current transmission.

For example, at least one spatial relationship of the PUCCH is configured by high-layer signaling, and one or more of the at least one spatial relationship are activated by the MAC CE for the current PUCCH transmission.

For another example, at least one spatial relationship of the PUCCH is configured by high-layer signaling, one or more of the at least one spatial relationship are activated by the MAC CE to be used as an activated spatial relationship subset, and one or more spatial relationships in the subset activated by the MAC CE are indicated by the physical layer signaling to be used for the current PUCCH transmission.

When one spatial relationship of the PUCCH is determined, a set of power control parameters of the PUCCH can be indexed. The power control parameter of the PUSCH is determined in at least one of the manners described below.

1. The step of determining an open-loop power control parameter of the PUSCH by an open-loop power control parameter of the PUCCH includes: directly determining the open-loop power control parameter of the PUSCH by the open-loop power control parameter of the PUCCH, or determining the open-loop power control parameter of the PUSCH by using the open-loop power control parameter of the PUCCH and a deviation between the PUCCH and the PUSCH.

The deviation between the PUCCH and the PUSCH at least includes a deviation of target received power. The deviation may be configured by the base station or predefined. For example, P0 of the PUSCH is 2 dB lower than P0 of the PUCCH.

2. The RS parameter of PL of the PUSCH is determined by the RS parameter of PL of the PUCCH, that is, the same RS is used for the PL value of the PUSCH and the PL value of the PUCCH.

3. The step of determining the closed-loop power control parameter of the PUSCH by the closed-loop power control parameter of the PUCCH includes at least one of:

1). whether cumulative closed-loop power control is enabled; or

2). determining the UE-local closed-loop power adjustment amount of the PUSCH by the UE-local closed-loop power adjustment amount of the PUCCH. Step 2) includes one of steps described below.

a. The UE-local closed-loop power adjustment amount of the PUCCH is used as the UE-local closed-loop power adjustment amount of the PUSCH.

b. At a preset moment, the closed-loop power control parameter of the PUCCH is used as the closed-loop power control parameter of the PUSCH, and at other moments, a UE-local closed-loop power adjustment amount maintained independently for the PUSCH is used.

For example, when DCI 0-0 is used for the PUSCH for the first time, the power control parameter cannot be obtained since no SRI exists in DCI 0-0. At this time, the current spatial relationship of the PUCCH is used to acquire the closed-loop power control parameter of the PUCCH, i.e., the UE-local closed-loop power adjustment amount of the PUCCH. Subsequently, the PUSCH scheduled by using DCI 0-0 is used. Since the TPC command is included in DCI 0-0, the PUSCH can use the TPC command to update the UE-local closed-loop power adjustment amount of the PUSCH, i.e., the UE-local closed-loop power adjustment amount is maintained by the PUSCH independently of the PUCCH. After the PUSCH is scheduled by DCI having the SRI, the power control parameter of the PUSCH is indexed by the SRI. When the PUSCH is scheduled by DCI 0-0 again, the PUSCH uses the spatial relationship of the PUCCH to acquire the closed-loop power control parameter of the PUCCH, that is, the UE-local closed-loop power adjustment amount of the PUCCH is used as the initial value of the UE-local closed-loop power adjustment amount of the PUSCH, and then the PUSCH scheduled by DCI0-0 is used to update the UE-local closed-loop power adjustment amount of the PUSCH by using the TPC command included in DCI 0-0.

For another example, when the PUSCH is scheduled by DCI 0-1 having no SRI, the PUSCH uses a predefined SRI to index the power control parameter of the PUSCH; or the PUSCH uses a predefined power control parameter of the PUSCH, such as the open-loop power control parameter set of the PUSCH having the predefined serial number, the open-loop power control parameter set of the PUSCH having the predefined serial number, the closed-loop power control parameter set of the PUSCH having the predefined serial number, and the RS parameter set of PL of the PUSCH having the predefined serial number. The predefined serial number refers to the smallest serial number among the defined set serial numbers or the specified number.

c. When the UE-local closed-loop power adjustment amount of the PUCCH is greater than a preset threshold, the UE-local closed-loop power adjustment amount of the PUSCH is determined by the UE-local closed-loop power adjustment amount of the PUCCH. c. For example, the preset threshold is 0, that is, only when the UE-local closed-loop power adjustment amount of the PUCCH is positive can the UE-local closed-loop power adjustment amount of the PUSCH be determined by the UE-local closed-loop power adjustment amount of the PUCCH. When the UE-local closed-loop power adjustment amount of the PUCCH is less than or equal to the preset threshold, the UE-local closed-loop power adjustment amount of the PUSCH is 0.

The above b) and c) can be combined: when the UE-local closed-loop power adjustment amount of the PUCCH is greater than the preset threshold, the closed-loop power control parameter of the PUCCH is used as the closed-loop power control parameter of the PUSCH at the preset moment, and the UE-local closed-loop power adjustment amount maintained independently for the PUSCH is used at other moments.

The preset moment refers to one of: a moment when the PUSCH is scheduled by DCI format 0-0 for the first time; a moment when scheduling the PUSCH by a DCI which is not DCI format 0-0 is converted into scheduling the PUSCH by DCI format 0-0; or a moment when a current spatial relationship of the PUCCH changes.

The above determination approaches of parameters can be all used by the PUSCH or partially used by the PUSCH.

When the determination methods are partially used by the PUSCH, the other power control parameters are obtained from parameters of the PUSCH itself. That is, the UE is notified in a manner of predefinition or a manner of configuration by the base station of the power control parameters used for PUSCH when no SRI exists.

For example, among the above parameters, only the RS of PL of the PUCCH is directly used as the RS of PL of the PUSCH, while the P0 value of MSG1 is used as P0 of the open-loop power control part of the PUSCH, alpha is predefined as 1, and the initial value of the UE-local closed-loop power control adjustment amount of the closed-loop power control part of the PUSCH is predefined as 0.

For another example, among the above parameters, the RS of PL of the PUCCH is directly used as the RS of PL of the PUSCH; the sum of the P0 value of the open-loop power control parameter of the PUCCH and the predefined deviation value is used as P0 of the open-loop power control part of the PUSCH, and the alpha value of the open-loop power control parameter of the PUCCH is used as alpha of the open-loop part of the PUSCH; the initial value of the UE-local closed-loop power control adjustment amount of the closed-loop power control part of the PUSCH is predefined as 0.

For another example, among the above parameters, the RS of PL of the PUCCH is directly used as the RS of PL of the PUSCH; the open-loop power control parameter of the PUCCH is used as the open-loop power control part of the PUSCH; at a preset moment, the closed-loop power control parameter of the PUCCH is used as the closed-loop power control parameter of the PUSCH, and at other moments, a UE-local closed-loop power adjustment amount maintained independently for the PUSCH is used.

The current PUCCH transmission described above may also be the latest PUCCH transmission.

The current PUCCH transmission does not necessarily refer to an actual PUCCH transmission, but refers to the configuration parameters of the PUCCH for a certain period of time. For example, the spatial relationship of the PUCCH activated by the MAC CE is not for a specific PUCCH, but for a time period from the moment when the MAC CE activates the spatial relationship of the PUCCH to the next moment when the MAC CE deactivates or reactivates similar information. In this time period, the power control parameters of the PUCCH indexed by the spatial relationships of the PUCCH activated by the MAC CE all refer to the current power control parameters of the PUCCH indexed by the spatial relationships of the PUCCH for the current PUCCH transmission.

The power control parameter for PUSCH transmission may also be determined by the power control parameter of the PUCCH corresponding to the specific spatial relationship of the PUCCH. The specific spatial relationship of the PUCCH includes a spatial relationship of the PUCCH configured by the base station or predefined, for example, the spatial relationship of the PUCCH having the smallest serial number among at least one spatial relationship of the PUCCH configured by the base station or the spatial relationship of the PUCCH having the predefined serial number.

The base station configures at least one set of power control parameters of the PUSCH for the UE. The base station configures at least one spatial relationship of the PUCCH for the UE. The base station configures the association between the spatial relationship of the PUCCH and the power control parameter of the PUSCH for the UE. The UE determines the spatial relationship of the PUSCH through the spatial relationship of the PUCCH, and obtains the power control parameter of the PUSCH according to the association between the spatial relationship of the PUSCH and the power control parameter of the PUSCH.

The base station configures at least one set of power control parameters of the PUSCH for the UE. The base station configures the association between downlink reference signal information and the power control parameter of the PUSCH for the UE. The UE obtains the power control parameter of the PUSCH according to the association between the downlink reference signal information and the power control parameter of the PUSCH through downlink reference signal information related to the PUSCH. The downlink reference signal information related to the PUSCH refers to one of: downlink reference signal information indicated by the TCI of the PDCCH including the current scheduling information of the PUSCH, or the best downlink reference signal obtained by the UE according to downlink channel measurement.

When the spatial relationship of the PUCCH changes, for example, the MAC CE activates a new spatial relationship of the PUCCH, the UE-local closed-loop power adjustment amount of the PUCCH is reset.

When the spatial relationship of the PUCCH changes, for example, the MAC CE activates a new spatial relationship of the PUCCH, the UE-local closed-loop power adjustment amount of the PUCCH associated with the new spatial relationship of the PUCCH is reset. For example, a plurality of UE-local closed-loop power adjustment amounts of the PUCCH may be provided, and is denoted by a serial number of 1. The base station configures the association between the spatial relationship of the PUCCH and the closed-loop power control parameter of the PUCCH, so the new spatial relationship of the PUCCH corresponds to a specific closed-loop power control parameter of the PUCCH. It is assumed that the old spatial relationship 1 of the PUCCH activated by the MAC CE is associated with the serial number 1=0 of the closed-loop power control parameter of the PUCCH, and that the new spatial relationship 2 of the PUCCH activated by the MAC CE is associated with the serial number 1=1 of the closed-loop power control parameter of the PUCCH. Then the MAC CE activates the new spatial relationship of the PUCCH, and the UE-local closed-loop power adjustment amount of the PUCCH of the closed-loop power control parameter of the PUCCH having the serial number of 1=1 is reset. Reset refers to set to a specified value, e.g., 0.

When the spatial relationship of the PUCCH changes, for example, the MAC CE activates a new spatial relationship of the PUCCH, and the PUSCH is scheduled by DCI having no SRI, e.g., DCI 0-0, the power control parameter of the PUSCH is determined by using a set of power control parameters of the PUCCH indexed by the new spatial relationship of the PUCCH. The specific manner is as described above.

When the PUSCH is scheduled by DCI having no SRI, e.g., DCI 0-0, and the spatial relationship of the PUCCH does not change at this time compared with the last time when the PUSCH was scheduled by the same DCI, the PUSCH maintains closed-loop power control independent of the PUCCH.

The PUSCH updates the local closed-loop power adjustment amount of the PUSCH by using the TPC command in the DCI that schedules the current PUSCH transmission.

Alternatively, when the cumulative closed-loop power adjustment is performed, the PUSCH performs update to the UE-local closed-loop power adjustment amount of the PUSCH by using the sum of the closed-loop power adjustment amount in the TPC command in the DCI that schedules the current PUSCH transmission and the UE-local closed-loop power adjustment amount of the PUCCH.

For the scenario of CA, on the cell/BWP configured with the PUCCH, the above method can be used to determine the power control parameter of the PUSCH by using the spatial relationship and power control parameter of the PUCCH on the same cell/BWP.

On a cell/BWP with no PUCCH configured, the power control parameter of a PUSCH scheduled by DCI having no SRI is determined by the spatial relationship and power control parameter of the PUCCH in a PUCCH group in which the PUSCH is located. That is, the PUCCH used to determine the power control parameter of the PUSCH and the PUSCH may not be limited to be in one BWP or service cell, but are within the same PUCCH group.

For convenience of description, the base station and the UE are used in the embodiments of the present disclosure, but are not intended to limit the present disclosure. In an implementation process, the base station and the UE may be replaced by the names of various communication nodes such as the NodeB (NB), gNB, transmitter receiver point (TRP), access point (AP), station, user, STA, relay, terminal, etc. The base station may also be replaced by the network, UTRA, EUTRA, etc.

It should be understood by those skilled in the art that functional modules/units in all or part of the steps of the method, the system and the apparatus disclosed above may be implemented as software, firmware, hardware and appropriate combinations thereof. In the hardware implementation, division of the functional modules/units mentioned in the above description may not correspond to division of physical components. For example, one physical component may have several functions, or one function or step may be executed jointly by several physical components. Some or all components may be implemented as software executed by processors such as digital signal processors or microcontrollers, hardware, or integrated circuits such as application-specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a RAM, a ROM, an EEPROM, a flash memory or other memory technologies, a CD-ROM, a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above are only exemplary embodiments of the present disclosure and are not intended to limit the present disclosure, and for those skilled in the art, the present disclosure may have various modifications and variations. Any modification, equivalent substitution, improvement and the like made within the spirit and principle of the present disclosure fall within the scope of the present disclosure.

We claim:

1. A power control method of a terminal, comprising:
   determining a power control parameter of a physical uplink shared channel (PUSCH) transmission according to a power control parameter of a physical uplink control channel (PUCCH),
   wherein the determining comprises determining a reference signal (RS) parameter of a pathloss (PL) of the PUSCH according to an RS parameter of a PL of the PUCCH,
   wherein the PUCCH is determined by a PUCCH resource, from a plurality of PUCCH resources, having a smallest PUCCH resource index, and
   wherein the PUCCH resource having the smallest PUCCH resource index and the PUSCH transmission belong to a same bandwidth part (BWP) and a same cell.

2. The method of claim 1, wherein the PUSCH is scheduled by a DCI format 0-0.

3. The power control method of claim 1,
   wherein the determining further comprises determining an open-loop power control parameter of the PUSCH according to an open-loop power control parameter of the PUCCH and a deviation between the open-loop power control parameter of the PUCCH and the open-loop power control parameter of the PUSCH.

4. The power control method of claim 1, wherein the determining further comprises determining a closed-loop power control parameter of the PUSCH according to a closed-loop power control parameter of the PUCCH comprising at least one of:
   whether cumulative closed-loop power control is enabled; or
   determining a power control adjustment state of the PUSCH according to a power control adjustment state of the PUCCH.

5. The power control method of claim 4, wherein the determining the power control adjustment state of the PUSCH according to the power control adjustment state of the PUCCH comprises one of:
   using the power control adjustment state of the PUCCH as the power control adjustment state of the PUSCH;
   at a preset moment, using the closed-loop power control parameter of the PUCCH as the closed-loop power control parameter of the PUSCH, and after the preset moment, the PUSCH using a power control adjustment state maintained independently for the PUSCH;

in response to the power control adjustment state of the PUCCH being greater than a preset threshold, determining the power control adjustment state of the PUSCH according to the power control adjustment state of the PUCCH; or in response to the power control adjustment state of the PUCCH being greater than a preset threshold at a preset moment, using the closed-loop power control parameter of the PUCCH as the closed-loop power control parameter of the PUSCH, and after the preset moment, the PUSCH using a power control adjustment state maintained independently for the PUSCH.

6. The power control method of claim 5, wherein the preset moment refers to one of:
a moment when the PUSCH is scheduled by downlink control information (DCI) format 0-0 for a first time;
a moment when scheduling the PUSCH by a DCI which is not DCI format 0-0 is converted into scheduling the PUSCH by DCI format 0-0;
a moment when a current spatial relationship of the PUCCH changes; or
a moment when the PUSCH is scheduled by DCI format 0-0 after the current spatial relationship of the PUCCH changes.

7. A computer-readable storage medium, comprising instructions which, when executed by a computer, cause the computer to carry out the method of claim 1.

8. A non-transitory computer-readable storage medium, comprising instructions which, when executed by a computer, cause the computer to carry out the method of claim 2.

9. A non-transitory computer-readable storage medium, comprising instructions which, when executed by a computer, cause the computer to carry out the method of claim 3.

10. A non-transitory computer-readable storage medium, comprising instructions which, when executed by a computer, cause the computer to carry out the method of claim 4.

11. A terminal, comprising a processor and a memory, wherein the processor is configured to execute a power control program stored in the memory to implement:
determining a power control parameter of a physical uplink shared channel (PUSCH) transmission according to a power control parameter of a physical uplink control channel (PUCCH),
wherein the determining comprises determining a reference signal (RS) parameter of a pathloss (PL) of the PUSCH according to an RS parameter of a PL of the PUCCH,
wherein the PUCCH is determined by a PUCCH resource, from a plurality of PUCCH resources, having a smallest PUCCH resource index, and
wherein the PUCCH resource having the smallest PUCCH resource index and the PUSCH transmission belong to a same bandwidth part (BWP) and a same cell.

12. The terminal of claim 11, wherein the PUSCH is scheduled by a DCI format 0-0.

13. The terminal of claim 11, wherein the determining further comprises determining an open-loop power control parameter of the PUSCH according to an open-loop power control parameter of the PUCCH and a deviation between the open-loop power control parameter of the PUCCH and the open-loop power control parameter of the PUSCH.

14. The terminal of claim 11, wherein the determining further comprises determining a closed-loop power control parameter of the PUSCH according to a closed-loop power control parameter of the PUCCH comprising at least one of:
whether cumulative closed-loop power control is enabled; or
determining a power control adjustment state of the PUSCH according to a power control adjustment state of the PUCCH.

15. A power control apparatus, comprising
at least one processor configured to:
determine a power control parameter of a physical uplink shared channel (PUSCH) transmission according to a power control parameter of a physical uplink control channel (PUCCH) by determining a reference signal, RS, parameter of a pathloss (PL) of the PUSCH according to an RS parameter of a PL of the PUCCH, and
determine the PUCCH by a PUCCH resource, from a plurality of PUCCH resources, having a smallest PUCCH resource index,
wherein the PUCCH resource having the smallest PUCCH resource index and the PUSCH transmission belong to a same bandwidth part (BWP) and a same cell.

16. The power control apparatus of claim 15, wherein the PUSCH is scheduled by a DCI format 0-0.

17. The power control apparatus of claim 15, wherein the at least one processor is further configured to determine an open-loop power control parameter of the PUSCH according to an open-loop power control parameter of the PUCCH and a deviation between the open-loop power control parameter of the PUCCH and the open-loop power control parameter of the PUSCH.

18. The power control apparatus of claim 15, wherein the at least one processor unit is further configured to determine a closed-loop power control parameter of the PUSCH according to a closed-loop power control parameter of the PUCCH, the determining comprising at least one of:
whether cumulative closed-loop power control is enabled; or
determining a power control adjustment state of the PUSCH according to a power control adjustment state of the PUCCH.

19. The power control apparatus of claim 18, wherein the at least one processor is further configured to determine the power control adjustment state of the PUSCH according to the power control adjustment state of the PUCCH, the determining comprising one of:
using the power control adjustment state of the PUCCH as the power control adjustment state of the PUSCH;
at a preset moment, using the closed-loop power control parameter of the PUCCH as the closed-loop power control parameter of the PUSCH, and after the preset moment, the PUSCH using a power control adjustment state maintained independently for the PUSCH;
in response to the power control adjustment state of the PUCCH being greater than a preset threshold, determining the power control adjustment state of the PUSCH according to the power control adjustment state of the PUCCH; or
in response to the power control adjustment state of the PUCCH being greater than a preset threshold at a preset moment, using the closed-loop power control parameter of the PUCCH as the closed-loop power control parameter of the PUSCH, and after the preset moment, the PUSCH using a power control adjustment state maintained independently for the PUSCH.

20. The power control apparatus of claim 19, wherein the preset moment refers to one of:
   a moment when the PUSCH is scheduled by downlink control information (DCI) format 0-0 for a first time;
   a moment when scheduling the PUSCH by a DCI which is not DCI format 0-0 is converted into scheduling the PUSCH by DCI format 0-0;
   a moment when a current spatial relationship of the PUCCH changes; or
   a moment when the PUSCH is scheduled by DCI format 0-0 after the current spatial relationship of the PUCCH changes.

* * * * *